(12) United States Patent
Lee et al.

(10) Patent No.: US 8,184,576 B2
(45) Date of Patent: May 22, 2012

(54) METHOD FOR STATE TRANSITION OF MOBILE TERMINAL

(75) Inventors: Young-Dae Lee, Gyeonggi-Do (KR); Sung-Duck Chun, Gyeonggi-Do (KR); Sung-Jun Park, Gyeonggi-Do (KR); Seung-June Yi, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 229 days.

(21) Appl. No.: 12/597,042

(22) PCT Filed: Apr. 29, 2008

(86) PCT No.: PCT/KR2008/002425
§ 371 (c)(1),
(2), (4) Date: Oct. 22, 2009

(87) PCT Pub. No.: WO2008/133470
PCT Pub. Date: Nov. 6, 2008

(65) Prior Publication Data
US 2010/0118811 A1    May 13, 2010

Related U.S. Application Data

(60) Provisional application No. 60/915,042, filed on Apr. 30, 2007, provisional application No. 60/915,417, filed on May 1, 2007, provisional application No. 60/915,917, filed on May 3, 2007.

(30) Foreign Application Priority Data

Apr. 24, 2008 (KR) .................. 10-2008-0038327

(51) Int. Cl.
*H04W 4/00* (2009.01)

(52) U.S. Cl. ........................................ 370/328
(58) Field of Classification Search ............... None
See application file for complete search history.

(56) References Cited

U.S. PATENT DOCUMENTS

| | | | |
|---|---|---|---|
| 4,205,200 | A | 5/1980 | Parikh et al. |
| 6,131,030 | A | 10/2000 | Schon et al. |
| 6,725,267 | B1 | 4/2004 | Hoang |
| 6,795,419 | B2 | 9/2004 | Parantainen et al. |
| 7,245,707 | B1 | 7/2007 | Chan |
| 7,551,643 | B2 | 6/2009 | Yeo et al. |

(Continued)

FOREIGN PATENT DOCUMENTS

AU    2007314859 B2    5/2008

(Continued)

OTHER PUBLICATIONS

Layer 2 functions for LTE, Tdoc R2-052377, 3GPP TSG RAN WG2 #48bis, Oct. 10-14, 2005, Cannes, France.

(Continued)

*Primary Examiner* — Anh-Vu Ly
(74) *Attorney, Agent, or Firm* — Birch, Stewart, Kolasch & Birch, LLP

(57) ABSTRACT

In a wireless mobile communications system, a state transition method of a mobile terminal is provided. The mobile terminal receives downlink data in a first state of the mobile terminal, a state of the mobile terminal keeps in the first state or transits to a second state based on a response message responding to the received downlink data, thereby minimizing an unnecessary state transition of the mobile terminal.

10 Claims, 5 Drawing Sheets

U.S. PATENT DOCUMENTS

| | | | |
|---|---|---|---|
| 7,680,058 B2 | 3/2010 | Seurre et al. | |
| 7,769,351 B2 | 8/2010 | Kwak et al. | |
| 7,801,527 B2 * | 9/2010 | Putcha | 455/435.1 |
| 7,899,451 B2 | 3/2011 | Hu et al. | |
| 7,958,542 B2 | 6/2011 | Herrmann | |
| 8,064,676 B2 | 11/2011 | Li et al. | |
| 2001/0017850 A1 | 8/2001 | Kalliokulju et al. | |
| 2002/0028690 A1 | 3/2002 | McKenna et al. | |
| 2002/0057663 A1 | 5/2002 | Lim | |
| 2002/0059464 A1 | 5/2002 | Hata et al. | |
| 2002/0091860 A1 | 7/2002 | Kalliokulju et al. | |
| 2003/0007490 A1 | 1/2003 | Yi et al. | |
| 2003/0007512 A1 | 1/2003 | Tourunen et al. | |
| 2003/0016698 A1 | 1/2003 | Chang et al. | |
| 2003/0123485 A1 | 7/2003 | Yi et al. | |
| 2003/0147371 A1 | 8/2003 | Choi et al. | |
| 2003/0165122 A1 | 9/2003 | Westphal | |
| 2003/0165133 A1 | 9/2003 | Garani | |
| 2003/0189922 A1 | 10/2003 | Howe | |
| 2003/0207696 A1 | 11/2003 | Willenegger et al. | |
| 2004/0014452 A1 | 1/2004 | Lim et al. | |
| 2004/0042507 A1 | 3/2004 | Pelletier et al. | |
| 2004/0117860 A1 | 6/2004 | Yi et al. | |
| 2004/0121771 A1 | 6/2004 | Song et al. | |
| 2004/0148427 A1 | 7/2004 | Nakhjiri et al. | |
| 2004/0229605 A1 | 11/2004 | Hwang et al. | |
| 2004/0253959 A1 | 12/2004 | Hwang et al. | |
| 2005/0041610 A1 | 2/2005 | Lee et al. | |
| 2005/0041681 A1 | 2/2005 | Lee et al. | |
| 2005/0063347 A1 | 3/2005 | Sarkkinen et al. | |
| 2005/0085254 A1 | 4/2005 | Chuah et al. | |
| 2005/0094670 A1 | 5/2005 | Kim | |
| 2005/0141462 A1 | 6/2005 | Aerrabotu et al. | |
| 2005/0160184 A1 | 7/2005 | Walsh et al. | |
| 2005/0176430 A1 | 8/2005 | Lee et al. | |
| 2005/0176437 A1 | 8/2005 | Mir | |
| 2005/0176474 A1 | 8/2005 | Lee et al. | |
| 2005/0185620 A1 | 8/2005 | Lee et al. | |
| 2005/0232271 A1 | 10/2005 | Kettunen et al. | |
| 2005/0238051 A1 | 10/2005 | Yi et al. | |
| 2005/0265294 A1 * | 12/2005 | Hu et al. | 370/335 |
| 2005/0286470 A1 | 12/2005 | Asthana et al. | |
| 2006/0034335 A1 | 2/2006 | Karaoguz et al. | |
| 2006/0067324 A1 | 3/2006 | Kim et al. | |
| 2006/0067364 A1 | 3/2006 | Jung et al. | |
| 2006/0087994 A1 | 4/2006 | Barth et al. | |
| 2006/0098567 A1 | 5/2006 | Willenegger et al. | |
| 2006/0126554 A1 | 6/2006 | Motegi et al. | |
| 2006/0165045 A1 | 7/2006 | Kim et al. | |
| 2006/0209870 A1 | 9/2006 | Lee et al. | |
| 2006/0245417 A1 | 11/2006 | Conner et al. | |
| 2007/0024972 A1 | 2/2007 | Kuerz et al. | |
| 2007/0047452 A1 | 3/2007 | Lohr et al. | |
| 2007/0047582 A1 | 3/2007 | Malkamäki | |
| 2007/0060139 A1 | 3/2007 | Kim et al. | |
| 2007/0064631 A1 | 3/2007 | Tseng et al. | |
| 2007/0155389 A1 | 7/2007 | Zhang | |
| 2007/0165567 A1 | 7/2007 | Tan et al. | |
| 2007/0165635 A1 | 7/2007 | Zhang et al. | |
| 2007/0177569 A1 | 8/2007 | Lundby | |
| 2007/0206531 A1 | 9/2007 | Pajukoski et al. | |
| 2007/0248075 A1 | 10/2007 | Liu et al. | |
| 2007/0258591 A1 | 11/2007 | Terry et al. | |
| 2007/0291646 A1 | 12/2007 | Ohishi et al. | |
| 2007/0291673 A1 | 12/2007 | Demirhan et al. | |
| 2007/0291719 A1 | 12/2007 | Demihan et al. | |
| 2007/0291728 A1 | 12/2007 | Dalsgaard et al. | |
| 2007/0291729 A1 | 12/2007 | Dalsgaard et al. | |
| 2007/0293224 A1 | 12/2007 | Wang et al. | |
| 2008/0025263 A1 | 1/2008 | Pelkonen | |
| 2008/0043619 A1 | 2/2008 | Sammour et al. | |
| 2008/0056198 A1 | 3/2008 | Charpentier et al. | |
| 2008/0056273 A1 | 3/2008 | Pelletier et al. | |
| 2008/0089285 A1 | 4/2008 | Pirskanen et al. | |
| 2008/0095185 A1 * | 4/2008 | DiGirolamo et al. | 370/464 |
| 2008/0101268 A1 | 5/2008 | Sammour et al. | |
| 2008/0167089 A1 | 7/2008 | Suzuki et al. | |
| 2008/0181127 A1 | 7/2008 | Terry et al. | |
| 2008/0182594 A1 * | 7/2008 | Flore et al. | 455/458 |
| 2008/0188223 A1 | 8/2008 | Vesterinen et al. | |
| 2008/0225765 A1 * | 9/2008 | Marinier et al. | 370/310 |
| 2008/0240439 A1 | 10/2008 | Mukherjee et al. | |
| 2008/0251810 A1 | 10/2008 | Torii | |
| 2008/0267126 A1 | 10/2008 | Vujcic et al. | |
| 2008/0273610 A1 | 11/2008 | Malladi et al. | |
| 2008/0280567 A1 * | 11/2008 | Sharma | 455/73 |
| 2009/0022107 A1 | 1/2009 | Kapoor et al. | |
| 2009/0040982 A1 | 2/2009 | Ho et al. | |
| 2009/0109912 A1 * | 4/2009 | DiGirolamo et al. | 370/329 |
| 2009/0124259 A1 | 5/2009 | Attar et al. | |
| 2009/0143074 A1 * | 6/2009 | Pelletier et al. | 455/452.2 |
| 2009/0163199 A1 * | 6/2009 | Kazmi et al. | 455/425 |
| 2009/0181710 A1 * | 7/2009 | Pani et al. | 455/509 |
| 2009/0207771 A1 | 8/2009 | Lindskog et al. | |
| 2009/0318170 A1 * | 12/2009 | Lee et al. | 455/458 |
| 2010/0027413 A1 * | 2/2010 | Park et al. | 370/216 |
| 2010/0165901 A1 | 7/2010 | Kim | |
| 2010/0227614 A1 | 9/2010 | Chun et al. | |
| 2010/0238799 A1 | 9/2010 | Sebire | |
| 2010/0272004 A1 | 10/2010 | Maeda et al. | |
| 2011/0039536 A1 * | 2/2011 | Lee et al. | 455/422.1 |
| 2011/0116436 A1 | 5/2011 | Bachu et al. | |

FOREIGN PATENT DOCUMENTS

| | | |
|---|---|---|
| CN | 1719932 A | 1/2006 |
| EP | 1148735 A1 | 10/2001 |
| EP | 1168877 | 1/2002 |
| EP | 1209938 | 5/2002 |
| EP | 1304898 A1 | 4/2003 |
| EP | 1315356 | 5/2003 |
| EP | 1318632 | 6/2003 |
| EP | 1 337 124 A2 | 8/2003 |
| EP | 1372310 A1 | 12/2003 |
| EP | 1511245 A2 | 3/2005 |
| EP | 1720322 A1 | 11/2006 |
| EP | 1720373 | 11/2006 |
| JP | 6-6294 A | 1/1994 |
| JP | 2002-539686 | 11/2002 |
| JP | 2003-504935 | 2/2003 |
| JP | 2003-87180 A | 3/2003 |
| JP | 2003-235064 A | 8/2003 |
| JP | 2005-354488 | 12/2005 |
| JP | 2006-505979 | 2/2006 |
| JP | 2006-67115 | 3/2006 |
| JP | 2006-515737 | 6/2006 |
| JP | 2007-165635 A | 6/2007 |
| JP | 2008-535370 A | 8/2008 |
| JP | 2008-539678 A | 11/2008 |
| JP | 2009-540721 A | 11/2009 |
| JP | 2009-542100 A | 11/2009 |
| KR | 10-2001-0105240 | 11/2001 |
| KR | 10-2004-0039944 | 5/2004 |
| KR | 10-2004-0048675 | 6/2004 |
| KR | 10-2005-0008440 | 1/2005 |
| KR | 10-2005-0027972 | 3/2005 |
| KR | 10-2005-0096763 | 10/2005 |
| RU | 2249917 C2 | 3/2003 |
| WO | WO 00/74416 | 12/2000 |
| WO | WO 2006/049441 A1 | 5/2006 |
| WO | WO 2006/075820 A1 | 7/2006 |
| WO | WO 2006/104344 | 10/2006 |
| WO | WO 2006/109851 | 10/2006 |
| WO | WO 2006/116620 A2 | 11/2006 |
| WO | WO 2007/025138 A2 | 3/2007 |
| WO | WO-2007/027032 A1 | 3/2007 |
| WO | WO 2007/052888 | 5/2007 |
| WO | WO 2007/078155 | 7/2007 |
| WO | WO 2007/078172 | 7/2007 |
| WO | WO 2007/078929 A2 | 7/2007 |
| WO | WO 2007/133034 A2 | 11/2007 |
| WO | WO 2008/054103 A1 | 5/2008 |
| WO | WO 2008/111684 A1 | 9/2008 |
| WO | WO 2009/084998 A1 | 7/2009 |

OTHER PUBLICATIONS

MAC PDU format for LTE, R2-070096, 3GPP TSG RAN WG2#56bis, Jan. 15-19, 2007, Sorrento, Italy.

Relative Buffer Status Reporting, R2-050852, 3GPP TSG-RAN WG2 meeting #46bis, Apr. 4-8, 2005, Beijing, China.

Requirements for Redirection in E-UTRAN, R2-070107, 3GPP TSG-RAN WG2 meeting #56-bis, Jan. 15-19, 2007, Sorrento, Italy.

Re-use of PDCP SN at ARQ level?, Tdoc R2-061829, 3GPP TSG-RAN2 Meeting #53bis, Jun. 27-30, 2006, Cannes, France.

Selective forwarding/retransmission during HO, Tdoc R2-070130, 3GPP TSG RAN2 Meeting #56bis, Jan. 15-19, 2007, Sorrento, Italy.

Catt et al: "Enhancement to Buffer Status Reporting" 3GPP TSG-RAN WG2#57bis, Mar. 22, 2007, St Julian's, Malta.

NTT Docomo et al: "MAC PDU structure for LTE" 3GPP TSG RAN WG2 #56bis, Jan. 15-19, 2007, Sorrento, Italy.

LG Electronics Inc., R2-073041; 3GPP TSG-RAN WG2 #59; Agenda Item 5.2.3, "PDCP retransmissions", Aug. 19-24, 2007, Athens, Greece, XP050135778.

LG Electronics Inc., R2-073259; 3GPP TSG-RAN WG2 #59; Agenda Item 5.2.3, "PDCP Structure and Traffic Path", Aug. 20-24, 2007, Athens, Greece, XP05013585.

LG Electronics Inc., R2-07xxxx, 3GPP TSG-RAN WG2 #59; "Contents of PDCP Status Report", Oct. 8-12, 2007, Shanghai, China, XP002580785.

"3rd Generation Partnership Project; Technical Specification Group Radio Access Network; Medium Access Control (MAC) Protocol Specification (Relesae 7)," 3GPP TS 25.321, vol. 7.4.0, Mar. 2007, pp. 1-126, XP050367709.

"3rd Generation Partnership Project; Technical Specification Group Radio Access Network; Packet data Convergence Protocol (PDCP) Specification (Relesae 7)," 3GPP TS 25.323, vol. 7.4.0, Mar. 2007, pp. 1-44, XP050367856A.

ASUSTeK, "Granularity Consideration for Variable RLC PDU Sizes," 3GPP TSG-RAN WG2 Meeting #56bis, vol. 1, Jan. 15-19, 2007, pp. 1-3, XP050133423.

Bosch, "Header Compression Signalling," 3rd Generation Partnership Project (3GPP), Nov. 29-Dec. 3, 1999, pp. 1-2, XP050114120.

Youjun, Gao et al., "Research on the Access Network and MAC Technique for Beyond 3G Systems," IEEE Wireless Communications, vol. 14, No. 2, Apr. 2007, pp. 57-61, XP011184637.

3GPP, "3rd Generation Partnership Project; Techinical Specification Group Radio Access Network; Evolved Universal Terrestrial Radio Access (E-UTRA) Medium Access Control (MAC) protocol specification (Release 8)", 3GPP TS 36.321 V8.1.0, XP050377617, Mar. 2008.

Alcatel-Lucent, "DL Control Signaling and Multiplexing for VoIP", 3GPP TSG RAN WG1 Meeting #48bis, R1-071721, St. Julians, Malta, XP-002460800, Mar. 26-30, 2007.

Extended European Search Report, dated Nov. 24, 2010, for European Application No. 08010995.2.

Extended European Search Report, dated Nov. 5, 2010, for European Application No. 08753268.5.

LG Electronics Inc., "Support for VoIP over MAC-hs/ehs", 3GPP TSG-RAN WG2 #57bis, R2-071542, St. Julian's, Malta, XP050134474, Mar. 26-30, 2007.

LG Electronics Inc., "UL Timing Control related to Contention Resolution", 3GPP TSG-RAN WG2 #61bis, R2-081607, Shenzen, China, XP 050139334, Mar. 31-Apr. 4, 2008.

Nokia Corporation, Nokia Siemens Networks, "MAC Header Format", 3GPP TSG-RAN WG2 Meeting #59bis, R2-073891, Shanghai, China, XP-002602993, Oct. 8-12, 2007.

US Office Action, dated Dec. 10, 2010, for U.S. Appl. No. 12/451,185.

US Office Action, dated Nov. 1, 2010, for U.S. Appl. No. 12/449,016.

US Office Action, dated Nov. 9, 2010, for U.S. Appl. No. 12/451,219.

US Office Action, dated Nov. 9, 2010, for U.S. Appl. No. 12/451,255.

3GPP TSG RAN WG2 #56, NTT Docomo et al., "Views on DRX/DTX control in LTE," Nov. 6-10, 2006, Riga, Latvia, R2-063397, XP050132870.

3GPP TSG-RAN WG2 Meeting #57, Email Rapporteur (Nokia), "DRX in E-UTRAN," St. Louis, USA, Feb. 12-16, 2007, R2-070463, XP050133530.

3GPP TSG-RAN WGx Meeting #55, "Active mode DRX details," Seoul, Korea, Oct. 9-13, 2006, R2-062753, XP002437990.

3GPP TSG-RAN WG2#57, "MAC Header for Improved L2 Support for High Data Rates", R2-070810, 3rd Generation Partnership Project (3GPP), vol. RAN WG2, Feb. 9, 2007, XP050133836.

Sammour et al., U.S. Appl. No. 60/863,185, filed Oct. 27, 2006.

Ipwireless, "Contention Resolution in Non-synchronous RACH Access", RAN2 #54, Tdoc R2-062269, Aug. 28-Sep. 1, 2006, 5 pages.

LG Electronics, "Discussion on Message 4 in Random Access" 3GPP TSG-RAN WG2 #57bis, R2-071456, Mar. 26-30, 2007, 4 pages.

LG Electronics, "Discussion on Message 4 in Random Access", 3GPP TSG-RAN WG2 #57, R2-070519, Feb. 15-19, 2007, 4 pages.

LG Electronics, "Discussion on Message 4 in Random Access", 3GPP TSG-RAN WG2 #58, R2-071923, May 7-11, 2007, 4 pages.

LG Electronics, "U-plane ciphering at MAC/Physical Layer", 3GPP TSG-RAN WG2 #57 bis, R2-071550, Mar. 26-30, 2007, 3 pages.

NTT Docomo, Inc., "E-mail discussion on U-plane ciphering location for LTE", 3GPP TSG-RAN WG2 #57bis, Tdoc R2-071293, Mar. 26-30, 2007, 5 pages.

LG Electronics, "DRX Scheme," 3GPP TSG-RAN WG2 #56bis, R2-070265, Sorrento, lataly, Jan. 15th-19th, 2007, 4 pages.

Nokia, "Discontinuous Reception in CELL_FACH," 3GPP TSG-RAN WG2 Meeting #58, R2-071403, St. Julian's Malta, Mar. 26th-30th, 2007, 4 pages.

* cited by examiner

[Fig. 1]
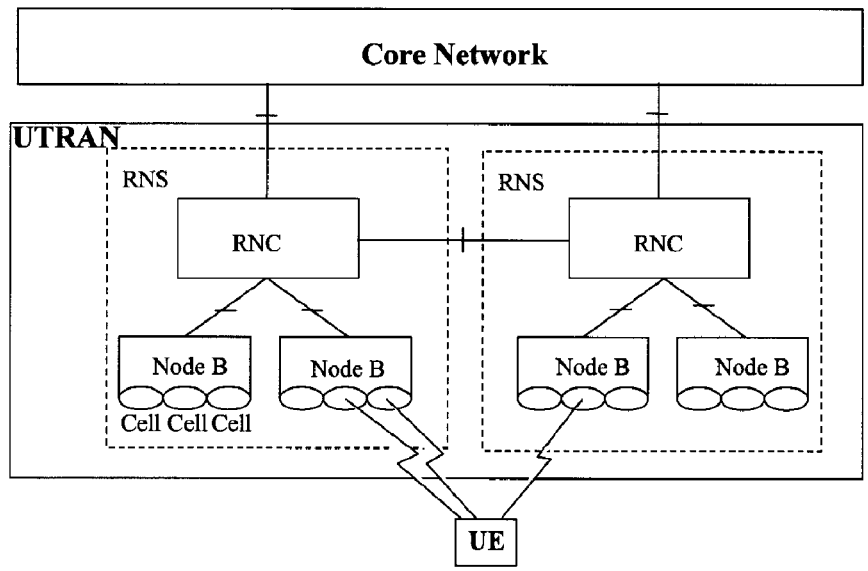
[Fig. 2]
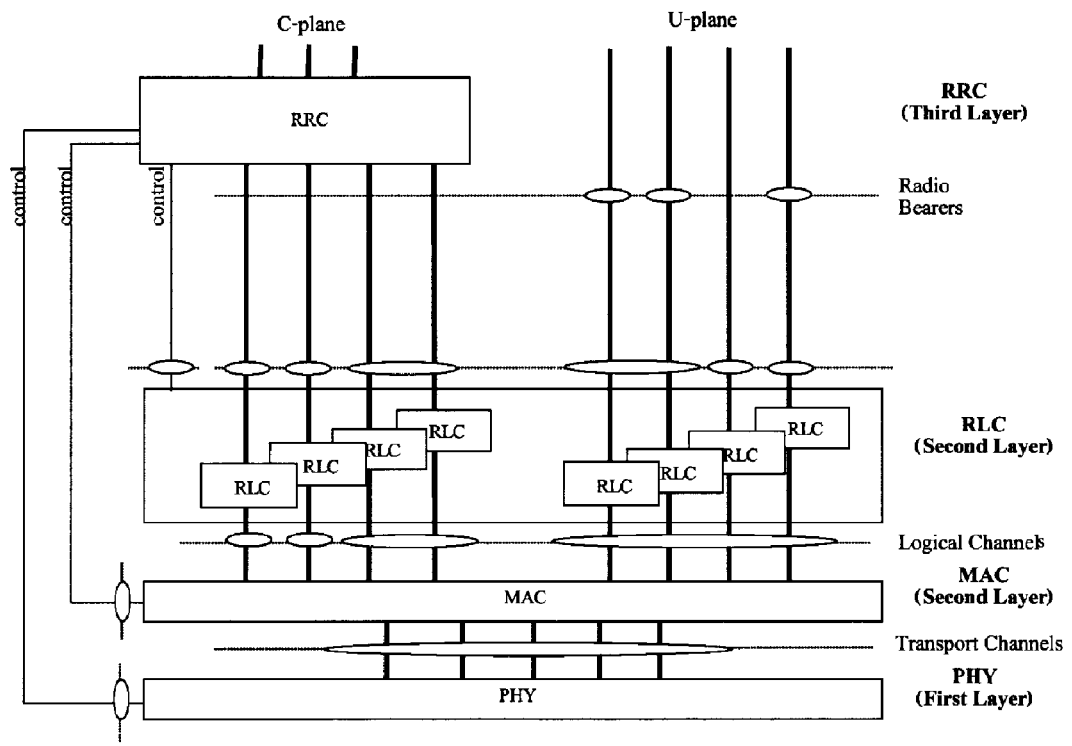

[Fig. 3]
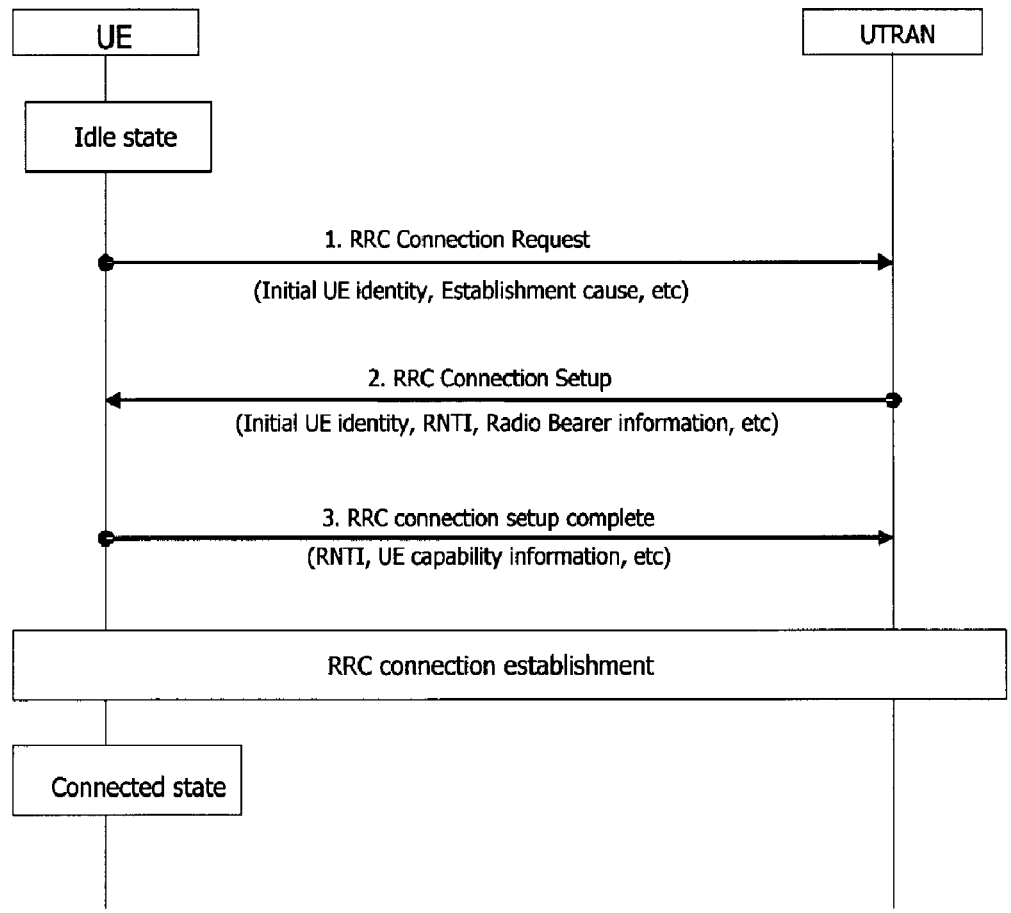
[Fig. 4]
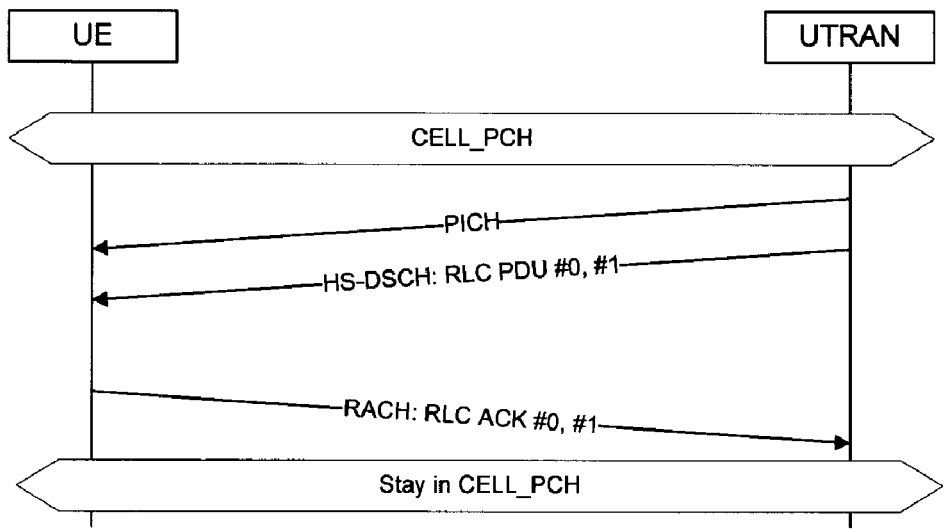

[Fig. 5]
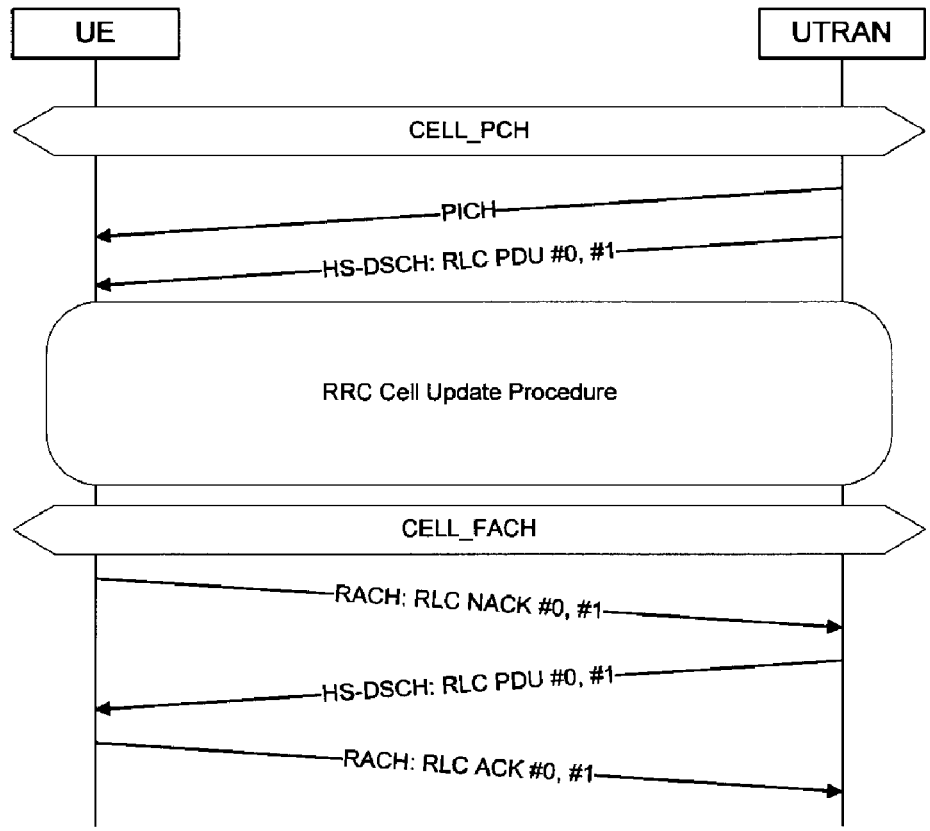
[Fig. 6]
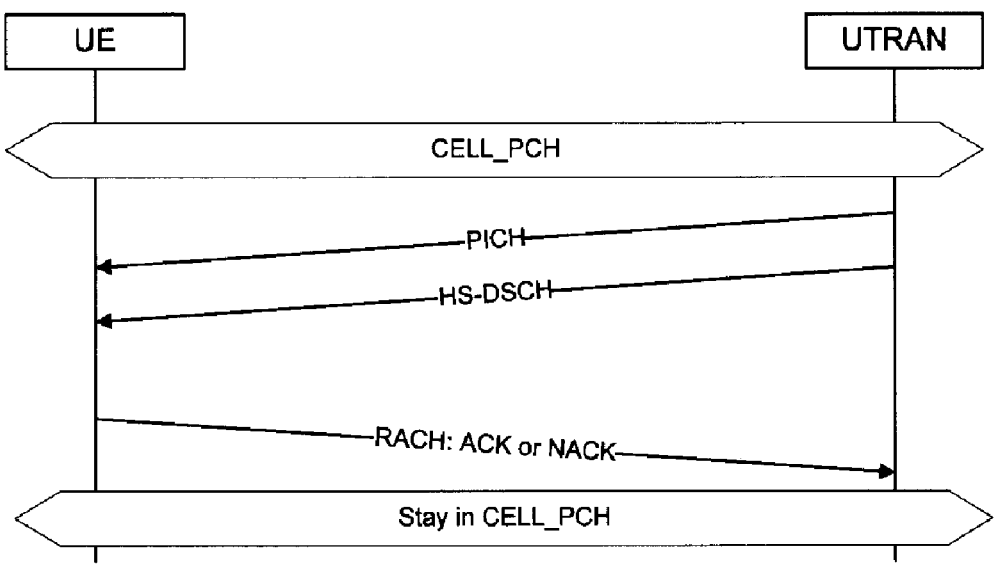

[Fig. 7]
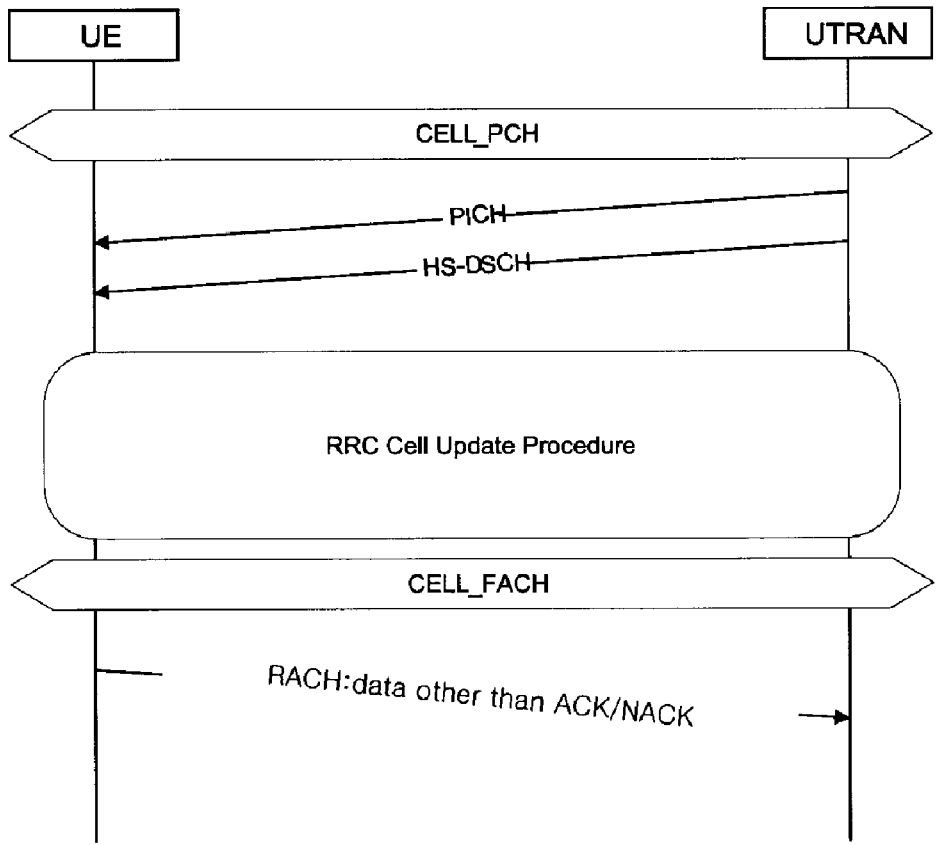
[Fig. 8]
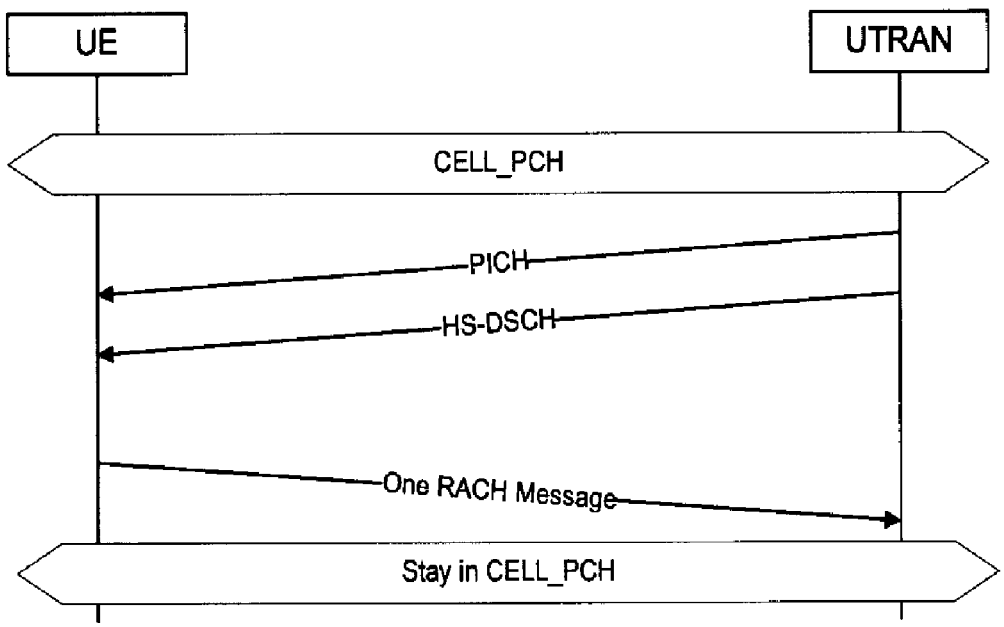

[Fig. 9]
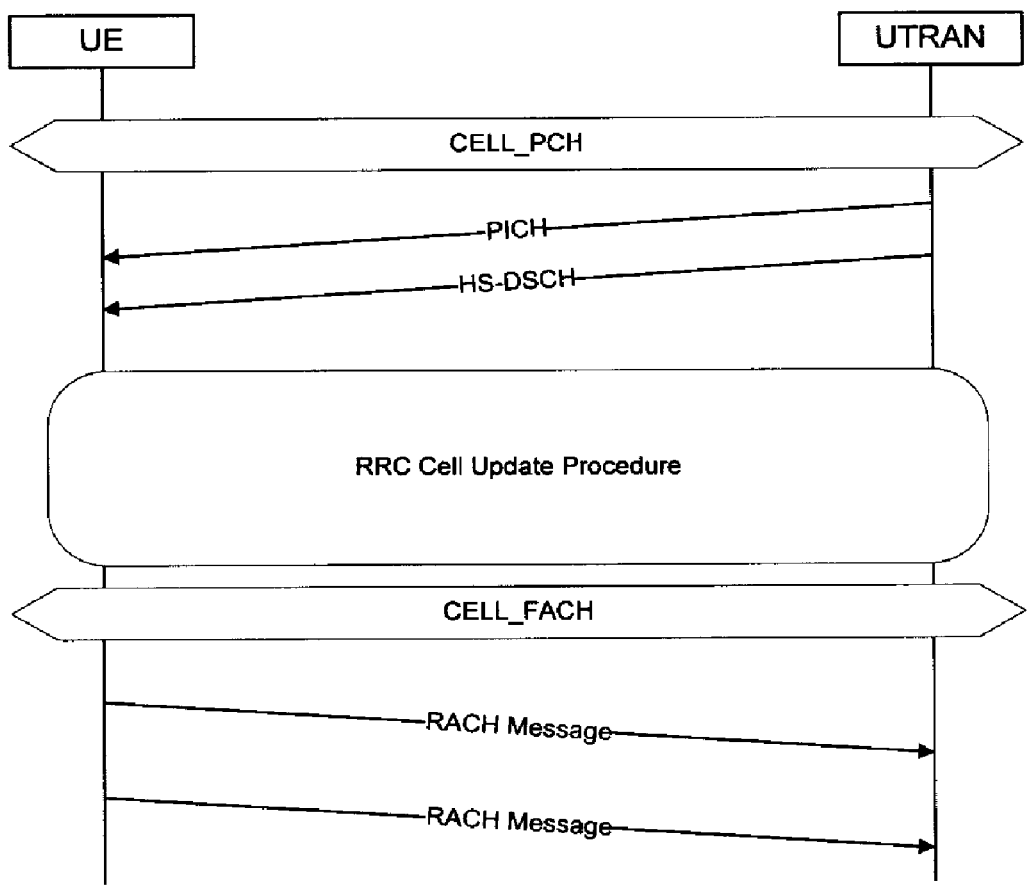

METHOD FOR STATE TRANSITION OF MOBILE TERMINAL

This application is the National Phase of PCT/KR2008/002425 filed on Apr. 29, 2008, which claims priority under 35 U.S.C. 119(e) to U.S. Provisional Application Nos. 60/915,042 filed on Apr. 30, 2007; 60/915,417 filed on May 1, 2007 and 60/915,917 filed on May 3, 2007 and under 35 U.S.C. 119(a) to Patent Application No. 10-2008-0038327 filed in Korea on Apr. 24, 2008, all of which are hereby expressly incorporated by reference into the present application.

TECHNICAL FIELD

The present invention relates to a state transition method for a mobile terminal, and more particularly, the mobile terminal receives downlink data in a first state of the mobile terminal, then a state of the mobile terminal keeps in the first state or transits to a second state based on a response message responding to the received downlink data, as such unnecessary state transition can be minimized, and efficient or improved way of state transition method for the mobile terminal can be achieved.

BACKGROUND ART

The universal mobile telecommunications system (UMTS) is a third-generation mobile communications system evolving from the global system for mobile communications system (GSM), which is the European standard. The UMTS is aimed at providing enhanced mobile communications services based on the GSM core network and wideband code-division multiple-access (W-CDMA) technologies.

FIG. 1 shows an exemplary diagram illustrating an Universal Mobile Telecommunication System (UMTS) network of a conventional mobile communication system. The UMTS is comprised of, largely, a user equipment (UE) or a mobile terminal (referred to a terminal hereafter), a UMTS Terrestrial Radio Access Network (UTRAN), and a core network (CN). The UTRAN comprises at least one Radio Network Sub-system (RNS), and each RNS is comprised of one Radio Network Controller (RNC) and at least one base station (Node B) which is controlled by the RNC. For each Node B, there is at least one cell.

FIG. 2 is an exemplary diagram illustrating a structure of a Radio Interface Protocol (RIP) between a UE and the UTRAN. Here, the UE is associated with a 3rd Generation Partnership Project (3GPP) wireless access network standard. The structure of the RIP is comprised of a physical layer, a data link layer, and a network layer on the horizontal layers. On the vertical plane, the structure of the RIP is comprised of a user plane, which is used for transmitting data, and a control plane, which is used for transmitting control signals. The protocol layers of FIG. 2 can be categorized as L1 (first layer), L2 (second layer), and L3 (third layer) based on an Open System Interconnection (OSI) model. Each layer will be described in more detail as follows.

The first layer (L1), namely, the physical layer, provides an upper layer with an information transfer service using a physical channel. The physical layer is connected to an upper layer called a medium access control (MAC) layer through a transport channel. Data is transferred between the MAC layer and the physical layer through the transport channel. Data is also transferred between different physical layers, i.e. between physical layers of a transmitting side and a receiving side, through the physical channel.

The MAC layer of the second layer (L2) provides an upper layer called a radio link control (RLC) layer with a service through a logical channel. The RLC layer of the second layer supports reliable data transfer and performs segmentation and concatenation of a service data unit (SDU) received from an upper layer.

The radio resource control (RRC) layer located at the lowest portion of the third layer (L3) is only defined in the control plane, and handles the controlling of transport channels and physical channels with respect to the establishment, re-configuration, and release of radio bearers (RB). The RB refers to a service provided by the second layer (L2) for transferring data between a UE and the UTRAN. In general, an RB being established refers to providing the characteristics of the protocol layers and channels required in providing a particular service, and refers to the procedures of configuring each particular parameter and operating method.

When the RRC layer of a particular UE and the RRC layer of the UTRAN are connected to allow messages to be transferred therebetween, that particular UE is said to be in RRC connected state, while the UE is said to be in idle state when there is no connection. A UE in RRC connected state is further divided into a URA_PCH state, a CELL_PCH state, a CELL_FACH state, and a CELL_DCH state. For those UEs in idle state, in URA PCH state, or in CELL_PCH state, a discontinuous reception (DRX) method is employed to minimize power consumption by discontinuously receiving a SCCPCH (Secondary Common Control Physical Channel) to which a PICH (Paging Indicator Channel) and a PCH (Paging Channel) are mapped. During the time periods other than for receiving the PICH or the SCCPCH, the UE is in sleeping mode state.

In the related art, the UE performing the DRX (discontinuous reception) method wakes up at every CN domain specific DRX cycle length or UTRAN specific DRX cycle length to receive a UE specific paging indicator (PI) of the PICH. The related art UE specific PI is used in order to notify a particular UE that a paging message for the particular UE will be transmitted via the PCH.

The PICH is divided into PICH frames having a length of 10 ms, and a single PICH frame is comprised of 300 bits. The 288 bits in the front portion of the PICH frame are used for the UE specific PICH, and more than one UE specific PI are transmitted. The 12 bits at the end of the PICH frame are not transmitted. For convenience, the 288-bit front portion of the PICH is defined as the "UE PICH," while the 12-bit rear portion is defined as the "PICH Unused Part."

A RRC connection will be described in more detail as follows. In order to establish the RRC connection with the UTRAN, an idle state of terminal has to perform a RRC connection procedure. FIG. 3 shows an exemplary diagram for explaining how a RRC connection is established. As illustrated in FIG. 3, to establish the RRC connection, the terminal transmits a RRC Connection Request Message to the UTRAN, and then the UTRAN transmits a RRC Connection Setup Message to the terminal in response to the RRC Connection Request Message. After receiving the RRC Connection Setup Message by the terminal, the terminal transmits a RRC Connection Setup Complete Message to the UTRAN. If the above steps are successfully completed, the terminal establishes the RRC connection with the UTRAN.

In the related art, if a terminal, which is in the CELL-PCH state, transmits an uplink ARQ (Automatic Repeat Request) or HARQ (Hybrid ARQ) feedback in response to the received downlink data, the terminal always performs a CELL UPDATE procedure so that the ARQ or HARQ feedback is transmitted from the terminal to the UTRAN in the CELL- FACH state. Due to this circumstance, the terminal has to perform the CELL UPDATE procedure to transit its state into the CELL_FACH state even if the terminal rarely receives downlink data. This would causes a great drawbacks of wasting radio resources and delaying of transmission time, as the terminal transits its state more than necessary.

DISCLOSURE OF INVENTION

Technical Solution

The present invention has been developed in order to solve the above described problems of the related art. As a result, the present invention provides a method for a state transition of mobile terminal in improved and efficient manner.

To implement at least the above feature in whole or in parts, the present invention may provide a method for a state transition of a mobile terminal in a wireless communications system, the method comprising: receiving a downlink data in a first state of the mobile terminal; and determining whether to keep a state of the mobile terminal in the first state or to change the state of the mobile terminal into a second state according to a response message that responds to the received downlink data.

The present invention may provide a method for a state transition of a mobile terminal in a wireless communications system, the method comprising: transmitting a downlink data in a first state of the mobile terminal; receiving a response message in response to the transmitted downlink data; and determining whether a state of the mobile terminal is in the first state or a second state according to the received response message.

Also, the present invention may provide a mobile terminal comprising: a radio protocol adapted to receive a downlink data in a first state of the mobile terminal and to determine whether to keep a state of the mobile terminal in the first state or to change the state of the mobile terminal into a second state according to a response message that responds to the received downlink data.

Additional features of this disclosure will be set forth in part in the description which follows and in part will become apparent to those having ordinary skill in the art upon examination of the following or may be learned from practice of this disclosure. The objectives and other advantages of this disclosure may be realized and attained by the structure particularly pointed out in the written description and claims hereof as well as the appended drawings.

BRIEF DESCRIPTION OF THE DRAWINGS

The accompanying drawings, which are included to provide a further understanding of this disclosure and are incorporated in and constitute a part of this specification, illustrate embodiments of this disclosure and together with the description serve to explain the principles of this disclosure.

In the drawings:

FIG. 1 is an exemplary network structure showing a Universal Mobile Telecommunications System (UMTS).

FIG. 2 shows an exemplary structure of a radio protocol architecture used in the UMTS.

FIG. 3 shows an exemplary RRC connection establishment between a terminal and an UTRAN.

FIG. 4 illustrates an exemplary protocol data unit (PDU) transmission without state transition according to first embodiment of present invention.

FIG. 5 illustrates an exemplary protocol data unit (PDU) transmission with state transition according to first embodiment of present invention.

FIG. 6 illustrates an exemplary data transmission without state transition according to second embodiment of present invention.

FIG. 7 illustrates an exemplary data transmission with state transition according to first embodiment of present invention.

FIG. 8 illustrates an exemplary data transmission without state transition according to third embodiment of present invention.

FIG. 9 illustrates an exemplary data transmission with state transition according to third embodiment of present invention.

MODE FOR THE INVENTION

Reference will now be made in detail to the preferred embodiments of this disclosure, examples of which are illustrated in the accompanying drawings.

One aspect of the present invention is the recognition by the present inventors regarding the problems and drawbacks of the related art described above and explained in more detail hereafter. Based upon such recognition, the features of the present invention have been developed.

Although this disclosure is shown to be implemented in a mobile communication system, such as a UMTS developed under 3GPP specifications, this disclosure may also be applied to other communication systems operating in conformity with different standards and specifications.

FIG. 4 shows an exemplary protocol data unit (PDU) transmission without state transition according to first embodiment of present invention.

A terminal (UE) may perform a DRX (discontinuous reception) and periodically monitor a PICH (Paging Indicator Channel) channel according to the DRX performance. During the monitoring by the terminal, if the terminal receives an indicator or a paging by the PICH channel, the terminal may receive a RLC PDU through a subframe of a HS-DSCH (High Speed-Downlink Shared Channel) channel that is corresponded or mapped to the PICH channel.

Here, if the terminal successfully receives the RLC PDU, the terminal may transmit a RLC ACK to a network (UTRAN) in response to the received RLC PDU and may stay in a CELL_PCH without any state transition to CELL_FACH. As such, the terminal (UE) may continue to stay in the CELL_PCH while avoiding signaling overhead due to the cell update and state transition back to the CELL_PCH. After that, the terminal may continuously perform the DRX. Here, the RLC ACK may be transmitted to the UTRAN through a RACH (random access channel) channel.

FIG. 5 illustrates an exemplary protocol data unit (PDU) transmission with state transition according to first embodiment of present invention.

A terminal (UE) may perform a DRX (discontinuous reception) and periodically monitor a PICH (Paging Indicator Channel) channel according to the DRX performance. During the monitoring by the terminal, if the terminal receives an indicator or a paging by the PICH channel, the terminal may receive a RLC PDU through a subframe of a HS-DSCH (High Speed-Downlink Shared Channel) channel that is corresponded or mapped to the PICH channel.

Here, if the terminal does not successfully receive the RLC PDU, the terminal may transmit a RLC NACK to a network (UTRAN) in response to the received RLC PDU after changing its terminal status into a CELL_FACH.

Specifically, the terminal may perform a RRC cell update procedure in order to transit its terminal state into the CELL_FACH. In the RRC cell update procedure, the terminal may transmit a RRC cell update message to the UTRAN, and then the UTRAN may transmit a cell update confirm message to the terminal in response to the RRC cell update message. Upon completion of the RRC cell update procedure, the terminal may be in the CELL_FACH. Also, the terminal may terminate the performance of the DRX in the CELL_FACH.

Here, the terminal may transmit the RLC NACK along with the cell update message to the UTRAN. Also, the terminal may transmit the RLC NACK to the UTRAN after changing its status to the CELL_FACH. The terminal may perform the cell update procedure before transmitting the RLC NACK to the UTRAN because the RLC NACK in uplink will cause RLC level retransmission on HS-DSCH in downlink. For example, if the terminal receives the RLC level retransmission in the CELL_PCH, the terminal may wait for one paging DRX cycle. But, if the terminal receives the RLC level retransmission in the CELL_FACH, the terminal is allowed to receive it at any time. Thus, it better that the RLC level retransmission is done in the CELL_FACH.

The UTRAN may re-transmit the RLC PDU based on the RLC NACK, and the terminal may transmit a RLC ACK or NACK with respect to the retransmission of the RLC PDU. Here, the RLC ACK or NACK may be transmitted to the UTRAN through the RACH (random access channel) channel.

FIG. 6 shows an exemplary data transmission without state transition according to second embodiment of present invention.

A terminal (UE) may perform a DRX (discontinuous reception) and periodically monitor a PICH (Paging Indicator Channel) channel according to the DRX performance. During the monitoring by the terminal, if the terminal receives an indicator or a paging by the PICH channel, the terminal may receive data through a sub-frame of a HS-DSCH (High Speed-Downlink Shared Channel) channel that is corresponded or mapped to the PICH channel.

Here, if the terminal receives the data, the terminal may transmit a RLC ACK or NACK to a network (UTRAN) in response to the received data and may stay in a CELL_PCH without any state transition to CELL_FACH. As such, the terminal (UE) may continue to stay in the CELL_PCH while avoiding signaling overhead due to the cell update and state transition back to the CELL_PCH. After that, the terminal may continuously perform the DRX. Here, the RLC ACK or NACK may be transmitted to the UTRAN through a RACH (random access channel) channel.

FIG. 7 illustrates an exemplary data transmission with state transition according to second embodiment of present invention.

A terminal (UE) may perform a DRX (discontinuous reception) and periodically monitor a PICH (Paging Indicator Channel) channel according to the DRX performance. During the monitoring by the terminal, if the terminal receives an indicator or a paging by the PICH channel, the terminal may receive data through a sub-frame of a HS-DSCH (High Speed-Downlink Shared Channel) channel that is corresponded or mapped to the PICH channel.

Here, if the terminal receives the data, the terminal may transmit the RLC ACK or NACK to the UTRAN. If the terminal has any additional uplink data, which will be transmitted to the UTRAN, other than the RLC ACK or NACK, the terminal may transmit such additional data after changing its terminal status into a CELL_FACH.

Specifically, the terminal may perform a RRC cell update procedure in order to transit its terminal status into the CELL_FACH. In the RRC cell update procedure, the terminal may transmit a RRC cell update message to the UTRAN, and then the UTRAN may transmit a cell update confirm message to the terminal in response to the RRC cell update message. Upon completion of the RRC cell update procedure, the terminal may be in the CELL_FACH. Also, the terminal may terminate the performance of the DRX in the CELL_FACH.

Here, the terminal may transmit the additional data other than the RLC ACK or NACK along with the cell update message to the UTRAN. Also, the terminal may transmit the additional data other than the RLC ACK or NACK after changing its status to the CELL_FACH. Here, the additional data other than the RLC ACK or NACK may be transmitted to the UTRAN through the RACH (random access channel) channel.

FIG. 8 shows an exemplary data transmission without state transition according to third embodiment of present invention.

A terminal (UE) may perform a DRX (discontinuous reception) and periodically monitor a PICH (Paging Indicator Channel) channel according to the DRX performance. While the PICH channel is monitored by the terminal, the terminal may has some uplink data to be transmitted to the UTRAN. Here, if the uplink data is to be transmitted by one RACH message, the terminal may transmit the uplink data to the UTRAN by the one RACH message and may stay in a CELL_PCH without any state transition to CELL_FACH. As such, the terminal (UE) may continue to stay in the CELL_PCH while avoiding signaling overhead due to the cell update and state transition back to CELL_PCH. After that, the terminal may continuously perform the DRX.

FIG. 9 illustrates an exemplary data transmission with state transition according to third embodiment of present invention.

A terminal (UE) may perform a DRX (discontinuous reception) and periodically monitor a PICH (Paging Indicator Channel) channel according to the DRX performance. While the PICH channel is monitored by the terminal, the terminal may has some uplink data to be transmitted to the UTRAN. Here, if the uplink data is to be transmitted by two or more RACH messages, the terminal may transmit such uplink data after changing its terminal status into a CELL_FACH.

Specifically, the terminal may perform a RRC cell update procedure in order to transit its terminal status into the CELL_FACH. In the RRC cell update procedure, the terminal may transmit a RRC cell update message to the UTRAN, and then the UTRAN may transmit a cell update confirm message to the terminal in response to the RRC cell update message. Upon completion of the RRC cell update procedure, the terminal may be in the CELL_FACH. Also, the terminal may terminate the performance of the DRX in the CELL_FACH.

Here, the terminal may transmit the uplink data along with the cell update message to the UTRAN via the RACH channel. Also, the terminal may transmit the uplink data after changing its status to the CELL_FACH. Further, after the status of terminal is changed into the CELL_FACH, the terminal may transmit the uplink data using a plurality of RACH messages through the RACH (random access channel) channel.

Namely, if the terminal in the CELL_PCH transmits only the RLC ACK(s) in response to a DCCH (Dedicated Control Channel)/DTCH (Dedicated Traffic Channel) on HS-DSCH, the terminal may not perform the cell update procedure and continues staying in the CELL_PCH after transmitting the RLC ACK(s) on the RACH. Otherwise, the terminal may enter the CELL_FACH before the uplink transmission.

In addition, if the terminal in the CELL_PCH transmits only the RLC ACK(s) or NACK(s) in response to a DCCH/DTCH on HS-DSCH, the terminal may not perform the cell update procedure and continues staying in the CELL_PCH after transmitting the RLC ACK(s) or NACK(s) on the RACH. Otherwise, if the terminal in the CELL_PCH transmits any uplink data other than the RLC ACK or NACK, the terminal may enter the CELL_FACH before the uplink transmission and then may transmit the uplink data on the RACH in the CELL_FACH.

Also, if the terminal transmits the uplink data with a piggybacked RLC ACK or NACK, the terminal may enter the CELL_FACH before the uplink transmission and then may transmit the uplink data on the RACH in the CELL_FACH.

In addition, if the terminal in the CELL_PCH has uplink data that can be transmitted by one RACH message, the terminal may not perform the cell update procedure and may continue staying in the CELL_PCH after transmitting the data on the RACH. If the terminal in the CELL_PCH has the uplink data that need to be transmitted by more than one RACH messages, the terminal may enter the CELL_FACH before the uplink transmission and may transmit the uplink data on the RACH in the CELL_FACH. That means that in case of the uplink transmission, how large amount of data is in the terminal (UE) buffer may have to be considered. Thus, if the terminal has a small amount of data that can be transported by only one RACH message, the terminal may send the RACH in uplink without performing the cell update procedure. However, if the terminal has a large amount of data in the buffer corresponding to more than one RACH messages, the terminal may perform the cell update procedure and then may transmit the RACH in the uplink.

The present invention may provide a method for a state transition of a mobile terminal in a wireless communications system, the method comprising: receiving a downlink data in a first state of the mobile terminal; and determining whether to keep a state of the mobile terminal in the first state or to change the state of the mobile terminal into a second state according to a response message that responds to the received downlink data, wherein the response message is an ARQ (Automatic Repeat Request) feedback or a Hybrid ARQ feedback, the state of the mobile terminal keeps in the first state when the feedback is a positive response and the state of the mobile terminal changes into the second state when the feedback is a negative response, the first state is a CELL_PCH state that allows the mobile terminal to receive the downlink data while performing a DRX (Discontinuous Reception), the second state is a CELL_FACH state that allows the mobile terminal to continuously receive the downlink data, the downlink data includes at least one RLC PDU (Radio Link Control Protocol Data Unit), the response message is an ARQ (Automatic Repeat Request) feedback, a Hybrid ARQ feedback, or any uplink data other than the ARQ or HARQ feedback, the state of the mobile terminal keeps in the first state when the response message is the ARQ or HARQ feedback, and the state of the mobile terminal changes into the second state when the response message is the any uplink data other than the ARQ or HARQ feedback, the response message is formed by one or more RACH (Random Access Channel) messages, the state of the mobile terminal keeps in the first state when the response message is formed by the one RACH message, and the state of the mobile terminal changes into the second state when the response message is formed by the two or more RACH messages, the downlink data is received via a HS-DSCH (High Speed Downlink Shared Channel), a RRC cell update procedure is performed when the state of the mobile terminal is determined to be changed into the second state by transmitting a cell update message and receiving a cell update acknowledgement message in response to the cell update message, the response message is transmitted to a network together with the cell update message, the response message is transmitted to a network through a RACH (Random access Channel), and the response message is transmitted to a network after the state of the mobile terminal is changed into the second state.

It can be said that the present invention provides a method for a state transition of a mobile terminal in a wireless communications system, the method comprising: transmitting a downlink data in a first state of the mobile terminal; receiving a response message in response to the transmitted downlink data; and determining whether a state of the mobile terminal is in the first state or a second state according to the received response message, wherein the first state is a CELL_PCH state that allows the mobile terminal to receive the downlink data while performing a DRX (Discontinuous Reception) and the second state is a CELL_FACH state that allows the mobile terminal to continuously receive the downlink data, the downlink data includes at least one RLC PDU (Radio Link Control Protocol Data Unit), the response message is an ARQ (Automatic Repeat Request) feedback or a Hybrid ARQ feedback, and the state of the mobile terminal is determined to be in the first state when the feedback is a positive response and the state of the mobile terminal is determined to be in the second state when the feedback is a negative response, the response message is an ARQ (Automatic Repeat Request) feedback, a Hybrid ARQ feedback, or any uplink data other than the ARQ or HARQ feedback, and the state of the mobile terminal is determined to be in the first state when the response message is the ARQ or HARQ feedback and the state of the mobile terminal is determined to be in the second state when the response message is the any uplink data other than the ARQ or HARQ feedback, the response message is formed by one or more RACH (Random Access Channel) messages, and the state of the mobile terminal is determined to be in the first state when the response message is formed by the one RACH message and the state of the mobile terminal is determined to be in the second state when the response message is formed by the two or more RACH messages, the downlink data is transmitted through a HS-DSCH (High Speed Downlink Shared Channel), and the response message is received via a RACH (Random access Channel).

Also, the present invention may provide a mobile terminal comprising: a radio protocol adapted to receive a downlink data in a first state of the mobile terminal and to determine whether to keep a state of the mobile terminal in the first state or to change the state of the mobile terminal into a second state according to a response message that responds to the received downlink data.

Although the present invention is described in the context of mobile communications, the present invention may also be used in any wireless communication systems using mobile devices, such as PDAs and laptop computers equipped with wireless communication capabilities (i.e. interface). Moreover, the use of certain terms to describe the present invention should not limit the scope of the present invention to a certain type of wireless communication system. the present invention is also applicable to other wireless communication systems using different air interfaces and/or physical layers, for example, TDMA, CDMA, FDMA, WCDMA, OFDM, EV-DO, Mobile Wi-Max, Wi-Bro, etc.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

This specification describes various illustrative embodiments of the present invention. The scope of the claims is intended to cover various modifications and equivalent arrangements of the illustrative embodiments disclosed in the specification. Therefore, the following claims should be accorded the reasonably broadest interpretation to cover modifications, equivalent structures, and features that are consistent with the spirit and scope of the invention disclosed herein.

The invention claimed is:

1. A method for a state transition of a mobile terminal in a wireless communications system, the method comprising:
    receiving a downlink data in a first state of the mobile terminal; and
    determining whether to keep a state of the mobile terminal in the first state or to change the state of the mobile terminal into a second state according to a response message that responds to the received downlink data,
    wherein the response message is an ARQ (Automatic Repeat Request) feedback or a Hybrid ARQ feedback, and
    wherein the state of the mobile terminal keeps in the first state when the feedback is a positive response and the state of the mobile terminal changes into the second state when the feedback is a negative response.

2. The method of claim 1, wherein the first state is a CELL_PCH state that allows the mobile terminal to receive the downlink data while performing a DRX (Discontinuous Reception).

3. The method of claim 1, wherein the second state is a CELL_FACH state that allows the mobile terminal to continuously receive the downlink data.

4. The method of claim 1, wherein the downlink data includes at least one RLC PDU (Radio Link Control Protocol Data Unit) and the downlink data is received via a HS-DSCH (High Speed Downlink Shared Channel).

5. The method of claim 1, further comprising:
    performing a cell update procedure when the state of the mobile terminal is determined to be changed into the second state.

6. The method of claim 5, wherein the cell update procedure comprises:
    transmitting a cell update message; and
    receiving a cell update confirm message in response to the cell update message,
    wherein the response message is transmitted to a network together with the cell update message.

7. A method for a state transition of a mobile terminal in a wireless communications system, the method comprising:
    transmitting a downlink data in a first state of the mobile terminal;
    receiving a response message in response to the transmitted downlink data; and
    determining whether a state of the mobile terminal is in the first state or a second state according to the received response message,
    wherein the response message is an ARQ (Automatic Repeat Request) feedback or a Hybrid ARQ feedback, and
    wherein the state of the mobile terminal is determined to be in the first state when the feedback is a positive response and the state of the mobile terminal is determined to be in the second state when the feedback is a negative response.

8. The method of claim 7, wherein the first state is a CELL_PCH state that allows the mobile terminal to receive the downlink data while performing a DRX (Discontinuous Reception) and the second state is a CELL_FACH state that allows the mobile terminal to continuously receive the downlink data.

9. The method of claim 7, wherein the downlink data includes at least one RLC PDU (Radio Link Control Protocol Data Unit) and the downlink data is transmitted via a HS-DSCH (High Speed Downlink Shared Channel).

10. The method of claim 7, wherein the response message is received via a RACH (Random access Channel).

* * * * *